United States Patent [19]

Forkert

[11] Patent Number: 5,783,024
[45] Date of Patent: Jul. 21, 1998

[54] APPARATUS FOR APPLYING HEAT BONDABLE LAMINA TO A SUBSTRATE

[75] Inventor: Maurice J. Forkert, Fort Wayne, Ind.

[73] Assignee: NBS Imaging Systems, Inc., Fort Wayne, Ind.

[21] Appl. No.: 630,681

[22] Filed: Apr. 12, 1996

[51] Int. Cl.⁶ .................................................. B32B 35/00
[52] U.S. Cl. .......................... 156/351; 156/354; 156/364; 156/521; 156/555; 156/556
[58] Field of Search .................................. 156/256, 264, 156/353, 354, 355, 362, 378, 364, 517, 521, 519, 555, 556, DIG. 1, 908, DIG. 2, DIG. 33, DIG. 36, DIG. 45, DIG. 46, DIG. 51, 351

[56] References Cited

U.S. PATENT DOCUMENTS

| | | | |
|---|---|---|---|
| 3,140,214 | 7/1964 | Hofe | 156/DIG. 33 X |
| 3,455,768 | 7/1969 | Neimeyer | 156/521 |
| 3,536,550 | 10/1970 | Hofe | 156/267 X |
| 3,565,724 | 2/1971 | Yamaguchi | 156/354 X |
| 3,625,801 | 12/1971 | Reed et al. | 156/521 X |
| 3,658,629 | 4/1972 | Cramer et al. | 156/552 |
| 3,713,948 | 1/1973 | Kluger | 156/354 X |
| 4,181,558 | 1/1980 | Neubronner | 156/355 |
| 4,272,311 | 6/1981 | D'Angelo et al. | 156/250 X |
| 4,448,631 | 5/1984 | Eaton et al. | 156/521 |
| 4,491,492 | 1/1985 | Hetherington | 156/264 X |
| 4,517,042 | 5/1985 | Singer | 156/555 X |
| 4,717,441 | 1/1988 | Seki et al. | 156/521 |
| 4,832,783 | 5/1989 | Nechay et al. | 156/542 X |
| 4,925,521 | 5/1990 | Asbury, Jr. et al. | 156/DIG. 36 X |
| 4,966,644 | 10/1990 | Clark, Jr. et al. | 156/354 X |
| 4,985,096 | 1/1991 | Bekker-Madsen | 156/354 X |
| 4,992,130 | 2/1991 | Vermeulen et al. | 156/307.5 |
| 5,213,648 | 5/1993 | Vermeulen et al. | 156/307.5 |
| 5,336,871 | 8/1994 | Colgate, Jr. | 235/487 |
| 5,418,208 | 5/1995 | Takeda et al. | 503/227 |
| 5,466,293 | 11/1995 | Tanaka et al. | 118/264 |
| 5,489,567 | 2/1996 | Koshizuka et al. | 503/227 |

Primary Examiner—Curtis Mayes
Attorney, Agent, or Firm—Baker & Daniels

[57] ABSTRACT

Apparatus and method suitable for making a plurality of laminated substrates by applying a plurality of laminate sheets to corresponding plurality of substrates. The apparatus includes a lamina supply member capable of holding a supply of lamina from which successive sheets of lamina can be cut. A cutter is disposed in the apparatus such that the cutter is capable of cutting through the lamina to provide said successive sheets of laminate. A heater is provided for bonding each successive sheet of laminate to a corresponding substrate whereby the corresponding laminated substrate is formed. The supply of lamina is characterized by a current leading edge. The supply of lamina is cut through along a cutting line at a predetermined distance from the current leading edge of the lamina. This provides a first sheet of laminate having a trailing edge at the cutting line. Cutting also provides the lamina supply with a successive leading edge at the cutting line. There is substantially no wasted lamina material between the trailing edge of the laminate sheet and the successive leading edge of the lamina. The laminate sheet is then bonded to a corresponding substrate. The steps of cutting the lamina along a cutting line and bonding the resultant lamina sheet to a corresponding substrate are repeated a plurality of times to yield the plurality of laminated substrates.

12 Claims, 5 Drawing Sheets

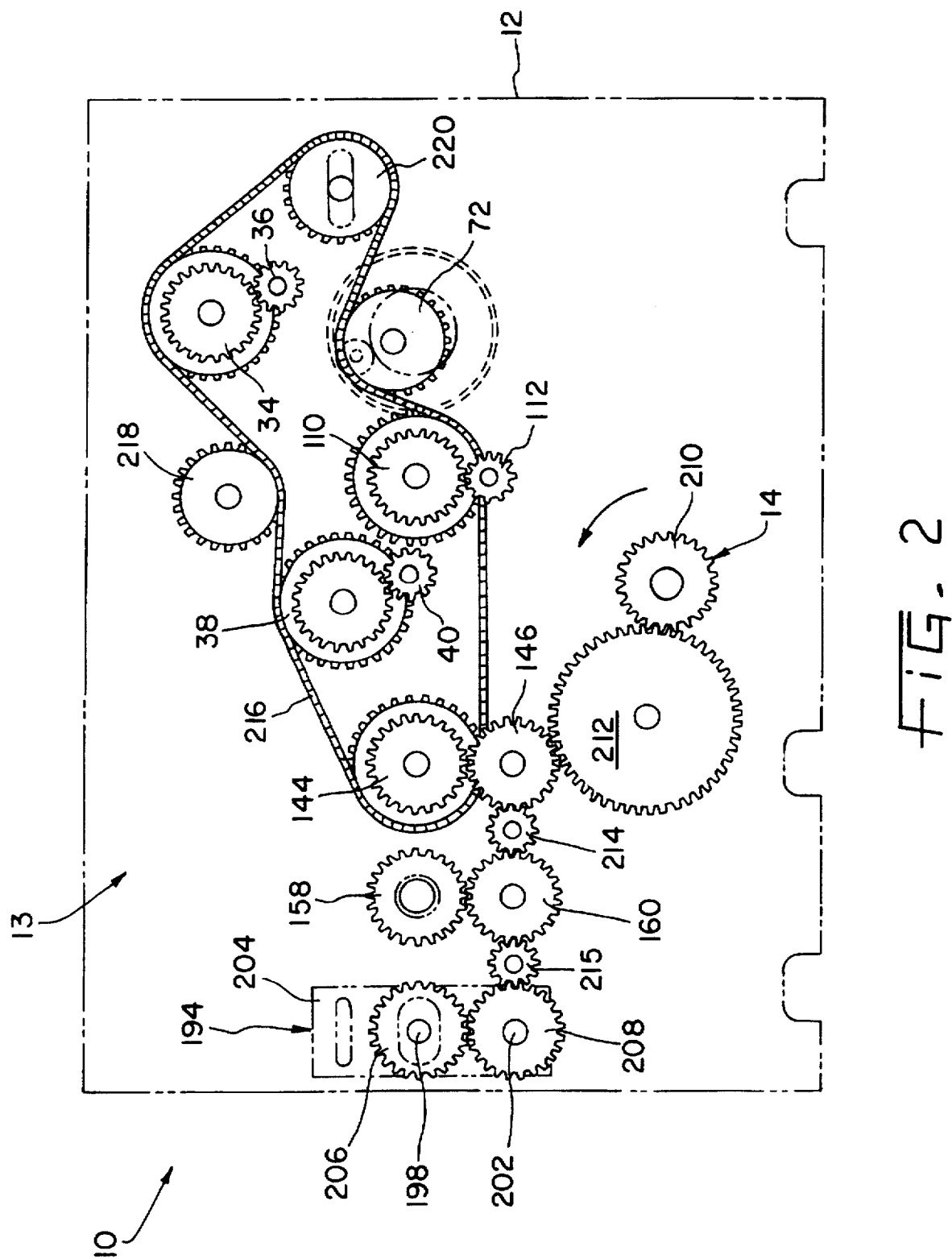

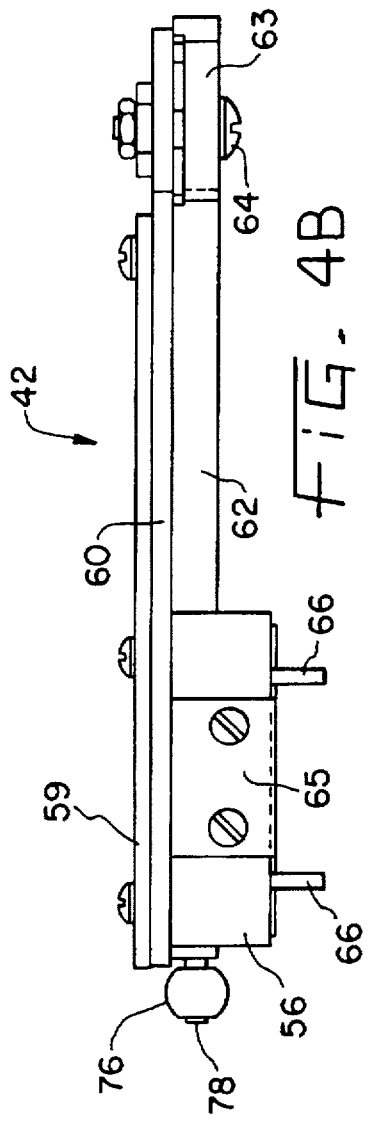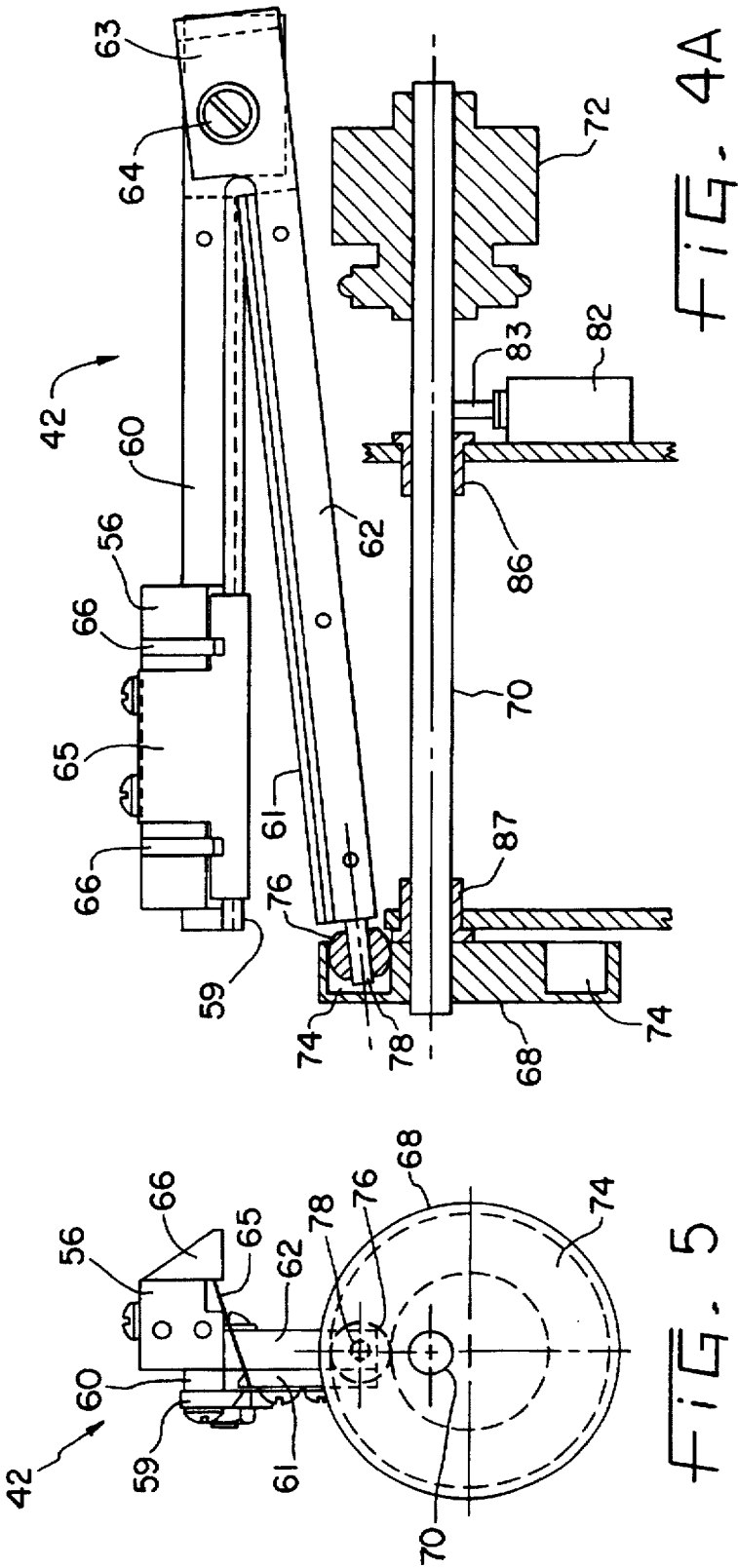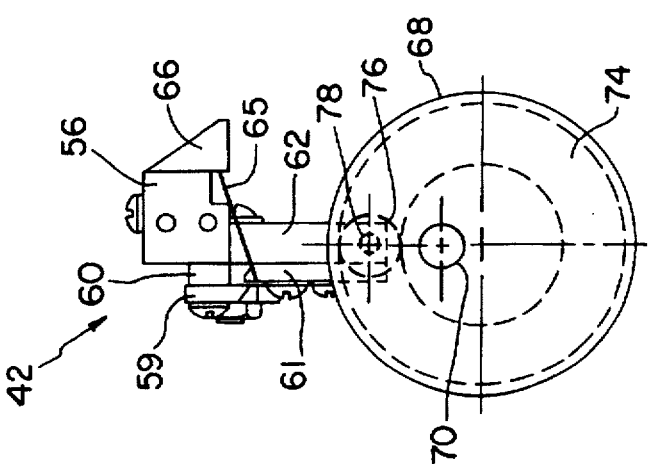

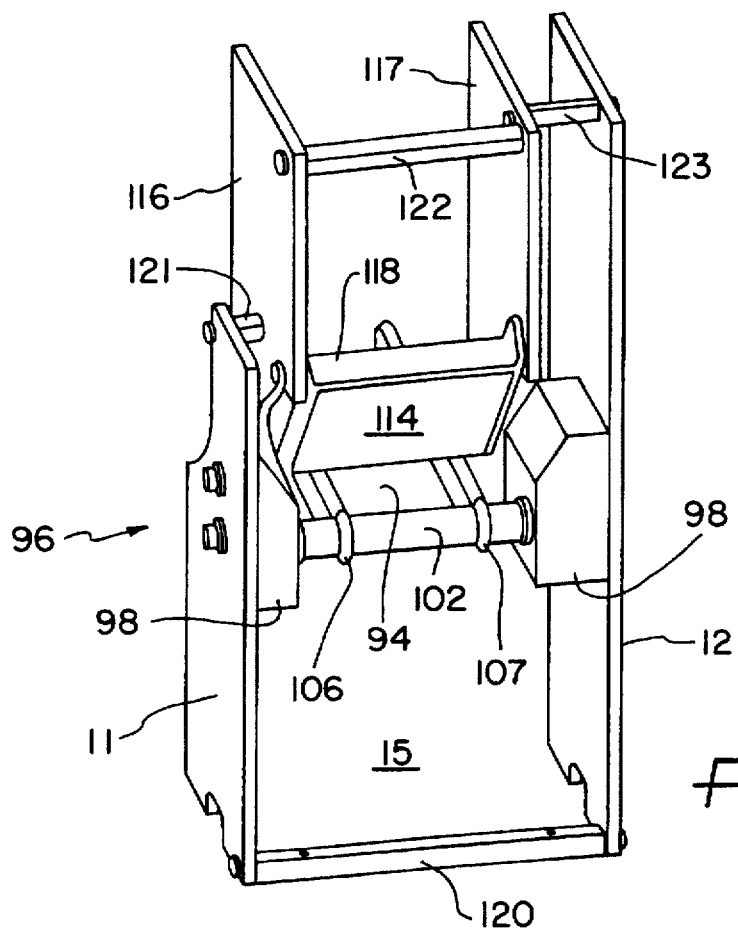
FIG. 6
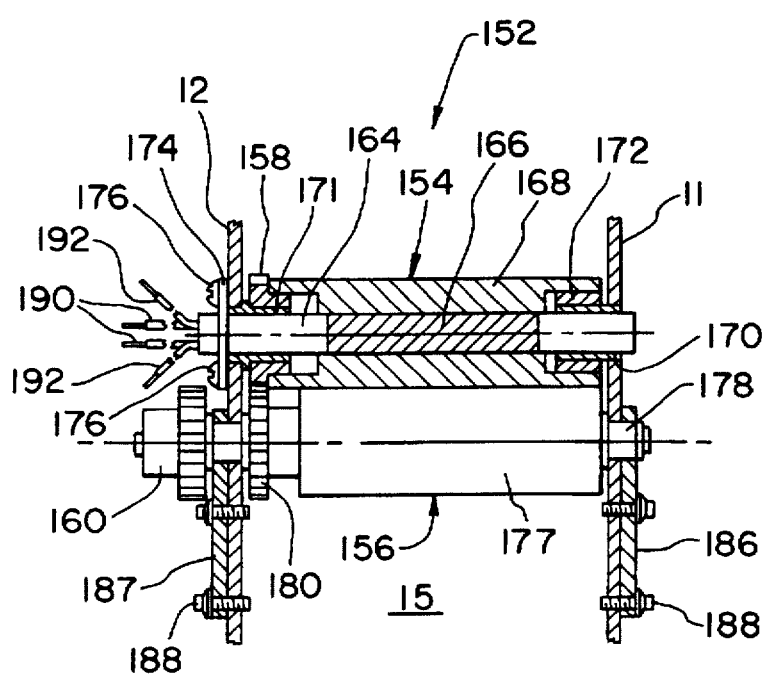
FIG. 7
FIG. 8

APPARATUS FOR APPLYING HEAT BONDABLE LAMINA TO A SUBSTRATE

FIELD OF THE INVENTION

The present invention relates to a method and apparatus for making laminated cards. More particularly, the present invention relates to a method and apparatus for laminating a plurality of heat bondable laminate sheets to a corresponding plurality of card substrates.

BACKGROUND OF THE INVENTION

Laminated cards are widely used as certificates of citizenship, employee identification cards, passports, driver's licenses, transaction cards, and other applications of a similar nature in which such cards establish a person's authorization to conduct certain activities. Laminated cards typically comprise a card-shaped substrate made from a suitable material such as paper, cardboard, or plastic. Information such as photographs, data, textual information, graphics, or the like, may be printed on one or both sides of the cards. In some applications, information may also be optically or magnetically stored on recording media provided within or on the surfaces of such cards.

In view of the widespread use of laminated cards, it is important that the information provided with the cards be protected against damage. It is also important that the information be protected against unauthorized alterations. Accordingly, the information provided on the substrate may be covered by a protective plastic laminate sheet which is bonded to the substrate. Most commonly, heat-activated adhesives are used to accomplish such bonding.

When printed information on the substrate is protected by a plastic laminate sheet, the plastic sheet would have to be removed from the substrate in order to alter the printed information and then subsequently replaced after the alteration has been completed. To protect against this activity, the plastic sheet may include an authentication image of a type which is destroyed when the plastic film is removed, such as a holographic image, ultraviolet image, an image formed with pearlescent ink, a chemical patch, and the like. In an alternative approach, the authentication image is substantially invisible until the plastic is removed, after which the image becomes permanently visible. In either approach, the change in the state of the image indicates that the plastic film has been removed from the substrate. This, in turn, suggests that the printed information on the substrate may have been altered.

A number of different approaches have been used to laminate heat bondable plastic laminate sheets to card substrates, but such approaches which have been used for manufacturing large quantities of laminated cards tend to generate a substantial amount of waste material. For example, according to a "decal" approach, a 2 to 3 micron thick, heat transferrable, plastic laminate material is supported upon a carrier web. To apply the laminate material to the substrate, the substrate and the laminate material are brought into contact, and then the laminate material is transferred to the card using heat. This approach does not work too well, because the 2 to 3 micron thick coating is too thin to adequately protect the card against scratches and ultraviolet bleaching. Additionally, the left-over carrier web becomes scrap which must be thrown away. Additionally, leftover, and hence wasted, laminate material remains on the carrier web in between the transferred areas.

According to a "die-cut" approach, a much thicker laminate material is supported upon a carrier web. With the laminate material being supported upon the carrier web, a plurality of individual, spaced-apart laminate sheets are die-cut in the laminate material in a manner such that the carrier web itself is not cut at all, or at least is not cut entirely through. After die-cutting, the excess laminate material between the spaced-apart sheets is removed from the web and thrown away as scrap, thus leaving only the spaced apart, die cut sheets on the web. The individual sheets must be spaced apart relative to each other when using this approach in order to allow registration marks to be placed on the material in the unused regions between the sheets. The registration marks are used to register the sheets on corresponding substrates. Each successive die-cut sheet is then bonded to a corresponding substrate using a heater. The individual sheets must also be spaced apart in order to allow the carrier web to be pulled away from the heater after bonding in order to bring the next sheet into position for bonding to the next substrate. Like the process described above with respect to the 2 to 3 micron thick laminate material, the left-over carrier web from this approach also becomes scrap which must be thrown away.

An approach is needed which allows high volumes of laminated substrates to be fabricated without generating so much waste.

SUMMARY OF THE INVENTION

The present invention provides methods and apparatus for making laminated substrates, such as laminated cards, in which substantially no laminate material is wasted. Preferred embodiments of the present invention use a supply roll of lamina from which successive sheets of laminate are cut.

Advantageously, no carrier web is required and no scrap laminate material is generated except for the couple of inches or less of lamina material remaining at the end of a supply roll when the supply runs out.

The present invention is also quite versatile. Many varieties of card substrates and lamina material of varying type, nature, thickness, size, etc., can be effectively laminated together using the present invention. The present invention can also be set up for fully automatic operation or for hand-fed operation, as desired.

As still another advantage, the present invention allows laminate sheets to be accurately, reliably, and repeatedly placed in proper registration on corresponding substrates without any need for registration marks. Whereas prior art approaches require placement of registration marks in scrap areas of laminate materials in order to achieve proper registration, the present invention requires none, and indeed could not use such marks anyway, because the present invention has no scrap. As noted above, substantially all of the laminate material used in the method and apparatus of the present invention is used.

In one aspect, the advantages of the present invention are provided by an apparatus suitable for making a plurality of laminated substrates by applying a plurality of laminate sheets to corresponding plurality of substrates. The apparatus includes a lamina supply member capable of holding a supply of lamina from which successive sheets of lamina can be cut. A cutter is disposed in the apparatus such that the cutter is capable of cutting through the lamina to provide said successive sheets of laminate. A heater is provided for bonding each successive sheet of laminate to a corresponding substrate whereby the corresponding laminated substrate is formed.

Another aspect of the present invention concerns a process for making a plurality of laminated substrates. According to this aspect of the present invention, a supply of lamina is provided from which a successive plurality of laminate sheets are cut. The supply of lamina is characterized by a current leading edge. The supply of lamina is cut through along a cutting line at a predetermined distance from the current leading edge of the lamina. This provides a first sheet of laminate having a trailing edge at the cutting line. Cutting also provides the lamina supply with a successive leading edge at the cutting line. There is substantially no wasted lamina material between the trailing edge of the laminate sheet and the successive leading edge of the lamina. The laminate sheet is then bonded to a corresponding substrate. The steps of cutting the lamina along a cutting line and bonding the resultant lamina sheet to a corresponding substrate are repeated a plurality of times to yield the plurality of laminated substrates.

BRIEF DESCRIPTION OF THE DRAWINGS

The above-mentioned and other features and advantages of this invention, and the manner of attaining them, will become more apparent and the invention will be better understood by reference to the following description of the invention taken in conjunction with the accompanying figures, wherein:

FIG. 2 is a gear drive train of the present invention corresponding to the lamina processing assembly of FIG. 1;

FIG. 4a side view of a pair of motor driven scissors used in the assembly of FIG. 1 with some parts shown in cross section;

FIG. 4b is a top view of the scissors of FIG. 4a with some parts removed for clarity;

FIG. 5 is an end view of the scissors of FIG. 4a with parts removed to more clearly show the blade cam whose rotation opens and closes the scissors;

FIG. 6 is a perspective view showing the portion of the apparatus near the substrate entry zone of the lamina processing assembly of FIG. 1;

FIG. 7 is a side view of the heating apparatus used in the assembly of FIG. 1 with some parts shown in cross-section;

FIG. 8 is an end view of a portion of the heating apparatus of FIG. 7; and

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
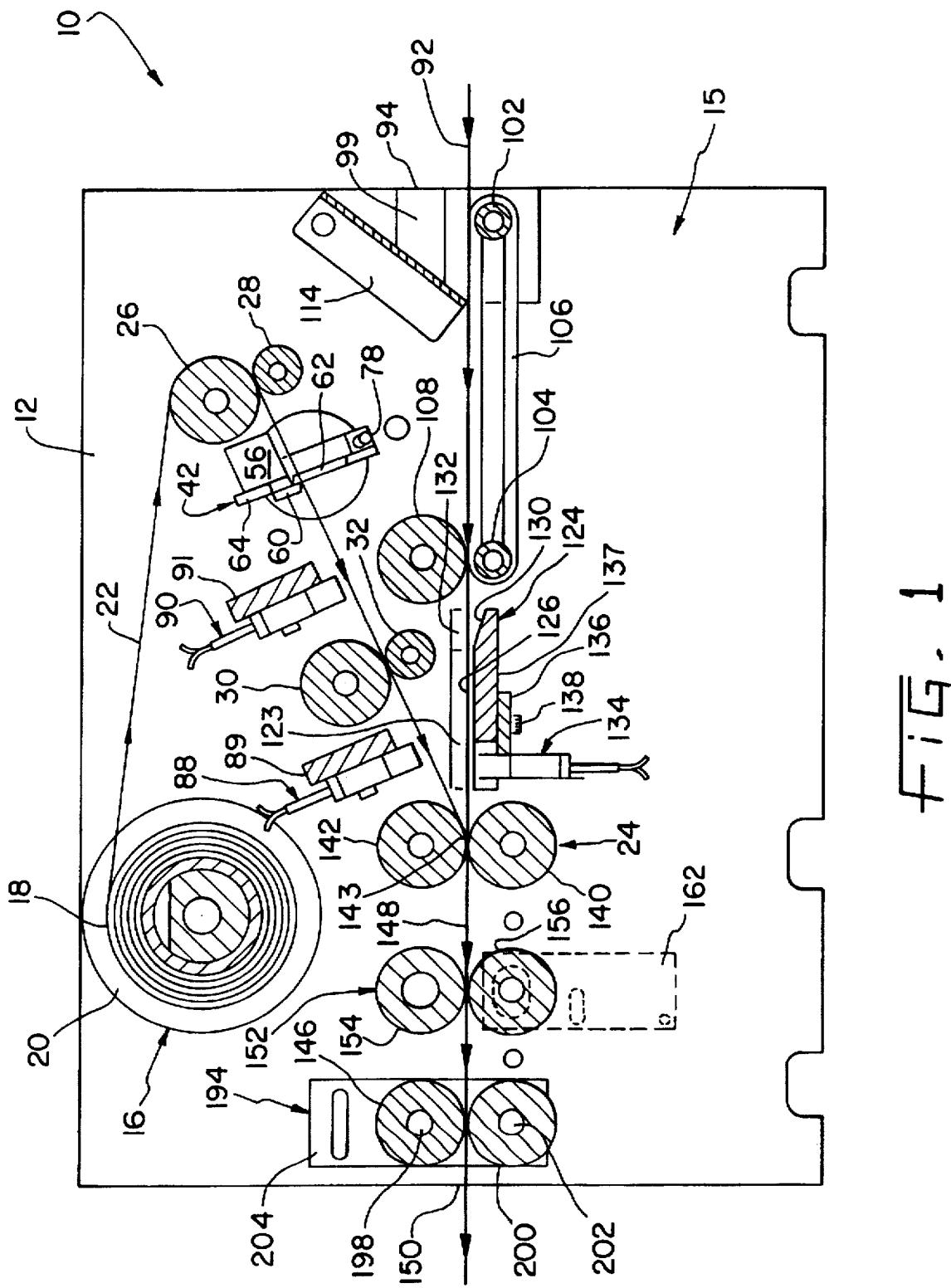
FIG. 1 is a plan view showing a lamina processing assembly of the present invention.

The various aspects of the present invention will now be described with reference to the particular laminating apparatus 10 shown in the figures. However, the description disclosed below are not intended to be exhaustive or to limit the invention to the precise forms disclosed in the following detailed description.

The apparatus 10 comprises a support structure containing a front housing wall 11 (part of which is shown only in FIGS. 6 and 7) and a rear housing wall which for purposes of clarity is not shown in the drawings. Middle housing wall 12 is disposed between the front housing wall and the rear housing wall and divides apparatus 10 into two main chambers. First chamber 13 houses gear and sprocket drive train, generally designated 14 in FIG. 2. The second chamber 15 houses the lamina processing assembly, generally designated 16 in FIG. 1.

The lamina processing assembly 16 includes a lamina supply member 20 on which a supply roll of heat bondable lamina 18 is rotatably stored. A wide variety of heat bondable lamina materials may be used in the practice of the present invention. Representative examples of suitable lamina material include "TBSN" lamina material available from TransilWrap and "H12-V" lamina material available from the Minnesota Mining and Manufacturing Company (3M).

A lamina supply path 22 extends from lamina supply member 20 to convergence zone 24. Optionally, a sensor (not shown) of any suitable type may be disposed on lamina supply path 22 proximal to supply member 20 in order to detect when the supply of lamina 18 runs out. Lamina supply path 22 passes between a first set of corresponding pinch rollers 26 and 28 and a second set of corresponding pinch rollers 30 and 32. First set of pinch rollers 26 and 28 are disposed on the lamina supply path 22 at a position which is upstream relative to a cutter which is generally designated 42. Second set of pinch rollers 30 and 32 are located on the lamina supply path 22 at a position which is downstream relative to the cutter 42.

First set of pinch rollers 26 and 28 are rotatably driven by clutch-driven gear and sprocket assembly 34 and idler gear 36, respectively. In a similar fashion, second set of pinch rollers 30 and 32 are driven by clutch-driven gear and sprocket assembly 38 and idler gear 40, respectively. The rotation of the gear and sprocket assemblies 34 and 38 and idler gears 36 and 40 causes pinch rollers 26, 30, 28 and 32 to correspondingly rotate. Rotation of these rollers, in turn, causes transport of lamina 13 along lamina supply path 22. Desirably, wire guides (not shown for purpose of clarity) may be disposed along the top and bottom of the lamina supply path 22 to help guide lamina 18.

Figure 3A:
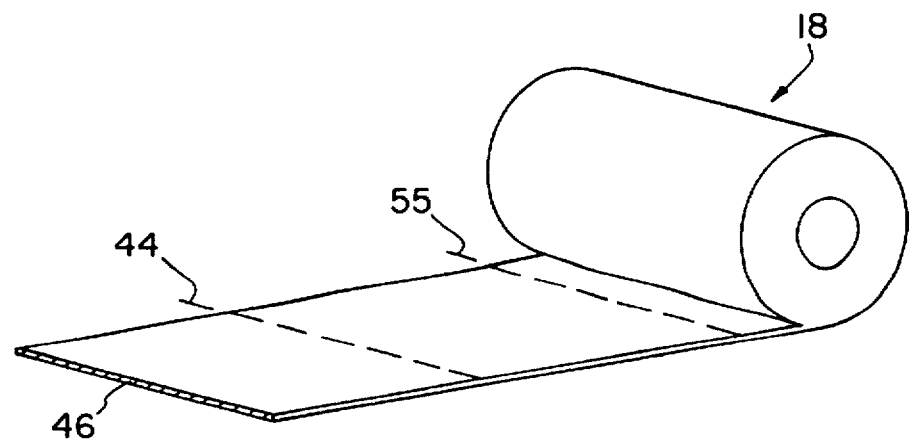
FIG. 3a is a schematic perspective view of a supply roll of lamina suitable for use in the practice of the present invention.
Figure 3B:
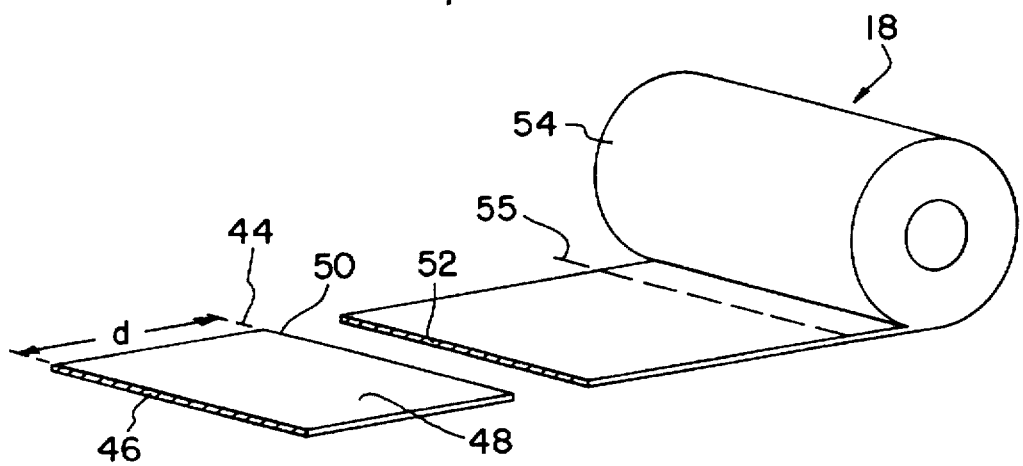
FIG. 3b is a schematic perspective view of the supply roll of lamina of FIG. 3a after a laminate sheet has been cut from the roll.

In the embodiment shown in the Figures, cutter 42 is a pair of motor-driven scissors. Referring now to FIGS. 1, 3a and 3b in particular, cutter/scissors 42 is disposed on the lamina supply path 22 for cutting the supply of lamina 18 along cutting line 44 at a predetermined distance d, from leading edge 46 of lamina 18. Cutting of lamina 18 along cutting line 44 provides heat bondable laminate sheet 48 having the same leading edge 46, but a newly provided trailing edge 50 at the cutting line 44. Cutting of lamina 18 along cutting line 44 also provides the supply roll of lamina 18 with a successive leading edge 52. The remaining portion of lamina 18 may then be cut along successive cutting line 55 to provide the next sheet of laminate corresponding to the portion of lamina 18 between successive leading edge 52 and successive cutting line 55. Additional sheets of laminate can be successively cut from the remaining portions of lamina 18 in a similar fashion until the supply of lamina runs out.

Advantageously, in the practice of the present invention, a plurality of laminate sheets can be cut from lamina supply 18 with substantially no waste between the trailing edge of each cut sheet and the successive leading edge of the next laminate sheet. As a result, except for the couple of inches or less of material remaining at the end of a roll, the present invention generates no wasted lamina, in sharp contrast to the prior art approaches which waste significant amounts of material.

Referring in particular now to FIGS. 1, 2, 4a, 4b, and 5, scissors 42 is secured in apparatus 10 upon mounting block 56. Scissors 42 includes a top cutting blade 59 provided on a fixed top arm 60. Fixed top arm 60, in turn, is mounted to mounting block 56. A bottom cutting blade 61 is provided on a pivoting bottom arm 62. Pivoting bottom arm 62 includes a pivoting arm portion 63 which is pivotably coupled to blade pivot 64. Bottom cutting blade 61 can thus pivot about the blade pivot 64 from an open position as shown in the Figures to a closed position at which the bottom cutting blade 61 cuttingly engages top cutting blade 59. When bottom cutting blade 61 is in the open position, lamina supply path 22 passes between top cutting blade 59 and bottom cutting blade 61. When the supply of lamina 18 is conveyed along lamina supply path 22 between blades 60 and 62, bottom cutting blade 61 closes and then opens to cut the lamina with a scissor type action.

Advantageously, lamina spring 65 is disposed on mounting block 56 to help bias the lamina 18 downward away from the fixed cutting blade 59 as the leading edge of the lamina 18 is guided through scissors 42. In the absence of lamina spring 65, the leading edge of lamina 18 may tend to jam against the upstream side of the top cutting blade 59 and/or the fixed top arm 60. Lamina spring 65 is desirably fabricated from a resiliently flexible material such as a metal, metal alloy, thermoplastic or thermoset polymer, and the like. Specific examples of suitable materials would include polycarbonate, polyurethane, polyester, copper, bronze, stainless steel, and aluminum or an aluminum alloy.

Fingers 66 project backwards from mounting block 56 and fit into corresponding grooves (not shown) in roller 26. Fingers 66 help prevent lamina 18 from wrapping upward around roller 26 as the leading edge of lamina 18 is guided past roller 26.

In the embodiment shown, scissors 42 is motor-driven. To accomplish this, clutch-controlled sprocket assembly 72 rotatably drives blade cam shaft 70 which, in turn, rotatably drives blade cam 68. Blade cam shaft 70 is rotatably journalled upon bearings 86 and 87 which are provided in apertures of auxiliary housing wall 58 and middle housing wall 12. Blade cam 68 includes ball track 74 for retaining cam follower 76. Finger 78, provided at the end of pivoting bottom arm 62, couples pivoting bottom arm 62 to cam follower 76. Rotatable blade cam 68 is eccentrically mounted on blade camshaft 70 such that rotation of blade cam 68 causes the pivoting bottom cutting blade 62 to pivotally open and close about blade pivot 64. As seen best in FIG. 1, scissors 42 is oriented such that the cutting action of the scissors is substantially perpendicular to the lamina supply path 22.

Generally, one revolution of blade cam 68 closes and then opens bottom cutting blade 61. To control this cutting action so that scissors 42 cuts each laminate sheet only once, shaft 70 is provided with shaft rotary location pin 83. Once during each revolution of shaft 70, pin 83 contacts shaft location switch 82. Thus, at the beginning of a cutting stroke, pin 83 may be positioned so that pin 83 is in contact, or just past the point of contact if desired, with switch 83. Clutch controlled sprocket 72 is engaged to rotate shaft 70. At the end of one shaft revolution, scissors 42 will have closed and opened to cut a laminate sheet from lamina 18. Pin 83 contacts switch 82 again after one revolution of shaft 70 as well, and sprocket 72 is then disengaged.

In those embodiments in which the fixed cutting blade is provided on the upstream side of scissors 42 relative to the pivoting cutting blade, successive leading edges of lamina 18 may tend to stick to fixed cutting blade 59 and/or fixed top arm 60 after lamina 18 has been cut. As a result, it then becomes difficult to convey such successive leading edge past scissors 42. Therefore, according to the embodiment of the present invention shown in the Figures, the pivoting cutting blade 61 is disposed on the lamina supply path on the upstream side of scissors 42 relative to fixed cutting blade 59. Advantageously, successive leading edges of cut lamina 18 do not tend to stick to the scissors 42 after cutting when the pivoting blade 61 is located on the upstream side of scissors 42, because the opening action of the pivoting blade 61 tends to release the successive leading edges.

Referring now to FIG. 1 in particular, apparatus 10 includes sensor 88 provided on mounting block 89 along supply path 22 between scissors 42 and convergence zone 24 in order to detect when a predetermined reference on lamina 18 is at a predetermined distance from the cutting line of scissors 42. Such a reference may be any suitable feature of lamina 18 which can be detected by the sensor. Examples of such features include the leading edge of the lamina 18 as well as markings, such as authentication images, provided on the surface of lamina 18. In the particular embodiment shown in FIG. 1, sensor 88 is disposed at a predetermined distance from the cutting line of scissors 42 to detect each successive leading edge of the supply of lamina 18 as lamina 18 is conveyed along path 22. When sensor 88 detects each such leading edge, lamina 18 being conveyed is stopped, and scissors 42 is actuated to cut lamina 18. As this process is repeated, all of the resultant laminated sheets will have been cut to a substantially identical length corresponding to the distance between sensor 88 and the cutting line of scissors 42. Advantageously, this approach is extremely accurate, reliable, and repeatable.

For example, laminate sheets are used to laminate many kinds of ISO Standard CR-80 type cards. All such cards, within specification tolerances, are characterized by a width of 2 ⅛ inches (5.40 cm) and a length of 3 ⅜ inches (8.57 cm). By providing a supply of lamina having a width of 2 inches (5.08 cm), and by positioning sensor 88 at a predetermined distance of 3 ¼ inches (8.25 cm) from the cutting line of scissors 42, a plurality of sheets suitable for laminating such cards can be easily provided using apparatus 10 of the present invention.

In other applications, lamina supply 18 may bear a plurality of authentication images, such as holographic images or the like, which must be precisely positioned on each corresponding substrate. For example, drivers licenses of some states and countries include a holographic authentication image precisely positioned over portions of the photographic image and textual information included on such licenses. To use apparatus 10 to make a plurality of laminated sheets suitable for laminating such substrates, alternative embodiments of the invention may include sensor 90 disposed at a position on lamina supply path 22 suitable for detecting when the authentication reference, rather than the leading edge, of lamina 18 is at a predetermined distance from the cutting line of scissors 42. When sensor 90 detects each such authentication image, scissors 42 may then be actuated to cut the lamina 18. As this process is repeated, all of the resultant laminated sheets will have been cut to a substantially identical length in which the authentication image is precisely positioned on each such sheet. Sensor 90 may be mounted on mounting block 91.

In the practice of the present invention, sensors 88 and 90 used in apparatus 10 may be any type of sensor known in the art which would be suitable for detecting the predefined reference of the lamina. One example of a type of sensor found to be suitable in the practice of the present invention for this purpose is a standard reflective type LED sensor. Such sensors are reliable and accurate. Further, as known in the art, the reliability and accuracy of such sensors can be even further improved by placing a dull, black, nonreflective plate (not shown), or another nonreflective type of member, in opposition to such sensors in order reduce the tendency of such sensors to generate false detection signals.

Referring now to FIGS. 1, 2 and 6 in particular, apparatus 10 includes a substrate supply path 92 extending from substrate entry zone 94 to convergence zone 24. A substrate guiding device, generally designated 96, is provided on substrate supply path 92 near substrate entry zone 94. Substrate guiding device 96 includes bevelled entry blocks 98 and 99 provided on each side of the substrate supply path 92. As seen best in FIG. 6, bevelled entry block 98 is mounted on front housing wall 11, and bevelled entry block 99 is mounted on middle housing wall 12. Above bevelled entry blocks 98 and 99, deflection plate 114 is pivotably disposed between auxiliary plates 116 and 117 on axle 118. Deflection plate 114 biases the substrates downward onto substrate supply path 92. A plurality of structural members, such as structural members 120, 121, 122 and 123, are provided in order to impart strength and rigidity to apparatus 10.

First conveyor roller 102 is rotatably supported between bevelled entry blocks 98 and 99. Further along the substrate supply path 92, path 92 passes between pinch roller 108 and second conveyor roller 104. A pair of endless loop drivers 106 and 107 are mounted around first conveyor roller 102 and second conveyor roller 104. Pinch roller 108 and second conveyor roller 104 are rotatably driven by clutch-controlled gear and sprocket assembly 110 and idler gear 112, respectively. Rotation of second conveyor roller 104, in turn, causes rotation of endless loop drivers 106 and 107 about first conveyor roller 102 and second conveyor roller 104. Such rotation of endless loop drivers 106 and 107 causes transport of a substrate along that portion of substrate supply path 92 corresponding to endless loop drivers 106 and 107.

Support member 124 is provided for supporting the substrate along another portion of path 92 after the substrate is conveyed past pinch roller 108 and second conveyor roller 104. Support member 124 has a flat upper surface 126 providing a pathway which is slidably engaged by the substrate as the substrate is conveyed across support member 124. Support member 124 further includes a pair of sidewall members, one of which is shown as sidewall 128, to help constrain the substrate in position on upper surface 126. Upper surface 126 includes an entry bevel 130, and the sidewall members include entry bevels such as bevel 132, in order to ease entry of the substrate onto support member 124.

Sensor 134 is provided on the substrate supply path 92 and is mounted in position by fastening sensor flange 136 to the underside surface 137 of support member 124 with a suitable fastener, such as screw 138. Sensor 134 detects when a reference on the substrate is at a predetermined distance from the convergence zone 24. As was the case with lamina 18, the substrate reference may be any suitable feature of the substrate which can be detected by sensor 134. Examples of such features include the leading edge of the substrate as well as any markings, such as images or textual information, which may be provided on the substrate.

In the particular embodiment shown in the figures, the position of sensor 134 is coordinated with the position of sensor 88 so that the substrate and the laminate sheet, after the sheet has been cut from lamina 18, arrive at convergence zone 24 in a manner which allows the substrate and the laminate sheet to be brought together in proper registration. For example, the cut sheet of laminate and the substrate desirably arrive at the convergence zone 24 at substantially the same time while being conveyed at substantially the same speed along their respective paths. In such embodiments, the distance between convergence zone 24 and sensor 134 is substantially the same as the distance between convergence zone 24 and sensor 88.

In the practice of the present invention, sensor 134 may be any sensor known in the art which would be suitable for detecting the predefined reference of the substrate. As was the case with sensors 88 and 90, one example of a type of sensor found to be suitable in the practice of the present invention is a standard reflective type LED sensor. As was also the case with sensors 88 and 90, the performance of such a sensor can be improved by placing a dull, nonreflective, black plate (not shown), or another nonreflective type of member, in opposition to said sensor in order to reduce the tendency of such sensor to generate false detection signals. Due to the positioning of sensors 88 and 134, a single plate may be disposed between the two sensors in order to reduce such false detection incidents.

In convergence zone 24, the laminate sheet and substrate are registrably brought into contact to provide a sheet-bearing substrate. Convergence zone 24, as shown, comprises a pair of pinch rollers 140 and 142 which are rotatably driven by idler gear 146 and clutch-driven gear and sprocket assembly 144, respectively. Lamina supply path 22 and substrate supply path 92 converge between pinch rollers 140 and 142 at convergence point 143 to form processing path 148, which extends from such point of convergence 143 to exit zone 150.

Heating apparatus 152 is disposed on processing path 148 for bonding the laminate sheet to a corresponding substrate. Heating apparatus 152 includes heated roller assembly 154 and corresponding pinch roller 156. Heated roller assembly 154 and pinch roller 156 are disposed on processing path 148 such that the laminate-bearing substrate is conveyed between heated roller assembly 154 and pinch roller 156 as the laminate bearing substrate is conveyed along the processing path. Pinch roller 156 is rotatably mounted on adjustment plate 162. Movement of adjustment plate 162 allows the distance between pinch roller 156 and heated roller assembly 154 to be changed in order to accommodate different thickness of substrates and laminates. Heated roller assembly 154 and pinch roller 156 are rotatably driven by gear 158 and gear 160, respectively. Together, heated roller assembly 154 and pinch roller press the laminate sheet and the substrate together as the heater applies heat for bonding.

As shown best in FIGS. 7 and 8, heated roller assembly 154 includes a non-rotatable heater core 164 having a heated portion 166. Rotatable outer shell 168 is disposed on non-rotatable heater core 164 such that the non-rotatable heater core 164 heats rotatable outer shell 168. Rotatable outer shell 168, in turn, heatably bonds the laminate sheet to the substrate. Rotatable outer shell 168 is coupled to non-rotatable heater core 164 by any suitable bearing means which allows rotatable outer shell 168 to rotate freely about the non-rotatable heater core 164. As shown in the embodiment in FIG. 7, rotatable outer shell 168 is coupled to non-rotatable heater core 164 by inner pair of bearings 170 and 171 and outer pair of bearings including bearing 172 and the hub of gear 158 which serves as the other outer bearing. Gear 158 couples the heated roller assembly 154 to pinch roller 156.

In one mode of practicing the present invention, inner bearings 170 and 171 are non-rotatably coupled to the non-rotatable heater core 164. Additionally, outer bearing 172 and the hub of gear 158 are non-rotatably coupled to rotatable outer shell 168. Outer bearing 172 and the hub of gear 158, however, are fully rotatable about inner bearings 170 and 171. In order to reduce friction between the two sets of bearings, it is desirable that at least one set of such bearings comprises a self lubricating resin which is preferably polytetrafluorethylene. Polytetrafluorethylene is more commonly referred to by its trade designation "Teflon". For example, inner bearing 170 and the hub of gear 158 may be fabricated from Teflon brand resin and outer bearing 172 and gear 158 may be fabricated from stainless steel.

Heated roller assembly 154 is mounted between middle housing wall 12 and front housing wall 11. Middle housing wall 12 and front housing wall 11 desirably include apertures for receiving corresponding ends of non-rotatable heater core 164. Flange 174 is used to secure heated roller assembly 154 to the middle housing wall 12 using any suitable fastener, such as screws 176.

Pinch roller 156 includes a roller body 177 and an axle 178. Axle 178 is rotatably received in corresponding apertures provided in middle housing wall 12 and front housing wall 11. Pinch roller 156 is secured in place by auxiliary plates 186 and 187 which are fastened to middle housing wall 12 and front housing wall 11 using any suitable fastener, such as screws 188. Pinch roller 156 is rotatably driven by gear 160. Gear 180 of pinch roller 156, in turn, rotatably drives gear 158 of heated roller assembly 154.

Energy for heating heated portion 166 of non-rotatable heater core 164 is provided to heated roller assembly 154 through heater wires 190. Thermocouple wires 192 are used to monitor the temperature of non-rotatable heater core 164. In order to maintain the non-rotatable heater core 164 at a desired temperature, the energy supply to heater wires 190 can be increased or decreased, as needed.

The process of using heat to bond the laminate sheet to the substrate can cause the resultant laminated substrate to bend, or "cargo" as such bending is sometimes called. Depending upon the materials used to fabricate the laminate sheet and the substrate, the face of the laminated substrate bearing the laminate sheet can be characterized by a convex or concave bend. It is desirable, therefore, to apply a reverse bend to the laminated substrate in order to remove such convex or concave bend.

Accordingly, as seen best in FIGS. 1 and 2, card straightener 194 is provided on processing path 148 for applying a reverse bend to the laminated substrate after the laminated substrate leaves heating apparatus 152. In the embodiments of the present invention as shown in the Figures, card straightener 194 is an assembly comprising a first pinch roller 196 having a center of rotation 198 and a second pinch roller 200 having a center of rotation 202. Pinch rollers 196 and 200 are rotatably mounted on adjustment plate 204 and are disposed on processing path 148 such that processing path 148 passes between rollers 196 and 200. A line extending from the center of rotation 198 to the center of rotation 202 defines a main axis of the card straightener 194. Adjustment plate 204 is pivotable about a pivot point so that the main axis of the card straightener 194 can be pivoted as well. Preferably, center of rotation 202 or 198, and more preferably center of rotation 202, serves as the pivot point for adjustment plate 204. Pinch rollers 196 and 200 are rotatably driven by gears 206 and 208, respectively.

Advantageously, because the main axis of card straightener is pivotable, card straightener 194 can be adjusted to provide a reverse convex or concave bend as desired. For example, in the embodiment in which center of rotation 202 serves as the pivot point for adjustment plate 204, pivoting of adjustment plate 204 toward the exit zone 150 causes the main axis of the card straightener 194 to pivot toward exit zone 150 as well. Such an orientation of the axis applies a reverse bend to the laminated substrate in which the leading edge of the laminated substrate is flexed downward. This is a useful approach for applying a reverse bend when the laminated substrate emerges from heating apparatus 142 in a condition in which the laminate sheet bearing side of the laminated substrate has a concave bend. On the other hand, pivoting of the adjustment plate 204 toward the heating apparatus 152 causes the main axis to pivot toward heating apparatus 152 as well. Such orientation of the main axis applies a reverse bend to the laminated substrate in which the leading edge of the laminated substrate is flexed upward by card straightener 194. This is a useful approach when the laminated substrate emerges from the heating apparatus 152 in a condition in which the laminate bearing side of the laminated substrate has a convex bend.

Gear and sprocket drive train 14 will now be more fully described with particular reference to FIG. 2. Power from a motor (not shown) is transferred to drive train 14 through motor driven gear 210. To ensure that the various components of the drive train embodiment shown in FIG. 2 rotate in the proper direction, motor driven gear 210 rotates counter-clockwise and is coupled to the remainder of drive train 14 through large idler gear 212. Rotation of idler gear 212 rotatably drives gear 146. Rotational power of gear 146 is subsequently transferred to gear 160 and gear 208 through idler gears 214 and 215, respectively. Idler gears 214 and 215 not only transfer power to gears 160 and 208, but the use of idler gears 214 and 215 also ensures that gears 160 and 208 are rotating in the proper direction. Gears 160 and 208 rotatably drive gears 158 and 206, respectively.

Gear 146 also transfers rotational power to gear and sprocket assembly 144. Gear and sprocket assembly 144 is coupled, in turn, to clutch driven gear and sprocket assemblies 34, 38, and 110, as well as clutch driven sprocket 72, by timing belt 216. Clutch driven sprocket assemblies 34, 38, and 110, in turn, rotatably drive corresponding gears 36, 40, and 112. Drive train 14 further includes idler gear 218 which is disposed in drive train 14 in a manner to maintain engagement between timing belt 216 and clutch driven gear and sprocket assemblies 34 and 38. Adjustable belt tensioning sprocket 220 is also provided and can be moved to adjust the tension of timing belt 216, as desired. Advantageously, use of timing belt 216 causes gear and sprocket assemblies 34, 38, 110, and 144 all to rotate at substantially the same rotational speed so that the substrate and the laminate sheet are conveyed along their respective paths at substantially the same speed. The scissor sprocket 72 need not rotate at the same speed as such assemblies, and, in the embodiment shown, sprocket 72 is configured to rotate at a quicker speed than such assemblies.

One mode of operation of the apparatus shown in the Figures will now be described. Clutch driven gear and sprocket assemblies 34 and 38 are engaged to cause rotation of rollers 26, 28, 30, and 32. Rotation of these rollers causes the transport of lamina 18 along lamina supply path 22. When the leading edge of lamina 18 is detected by sensor 88 or sensor 90, as the case may be, clutch driven gear and sprocket assemblies 34 and 38 are disengaged and transport of lamina 18 stops. Scissors 42 is then actuated to cut through lamina 18 along a cutting line to provide a first cut sheet of heat bondable laminate.

After scissors 42 cuts the lamina 18, clutch driven sprocket and gear assembly 110 is engaged which, in turn, actuates rollers 108, 104, and 102 to convey a substrate along the substrate supply path 92. Engaging sprocket and gear assembly 110 only after the lamina 18 is cut helps make sure that a substrate is not fed into the apparatus 10 too soon. The substrate enters apparatus 10 through substrate entry zone 94. Substrate may be fed into apparatus 10 in any desired manner. For example, the substrate may be hand fed into apparatus 10 or alternatively, may be automatically fed into apparatus 10 directly from a suitable device, such as a printer. As the substrate enters apparatus 10, deflection plate 114 biases the substrate against endless loop drivers 106 and 107. To convey the substrate along substrate supply path 92, clutch driven gear and sprocket assembly 110 is engaged to rotatably drive pinch roller 108, first conveyor roller 102, second conveyor roller 104, and endless loop drivers 106 and 107.

When the substrate is conveyed far enough along the substrate supply path 92, sensor 134 will detect the presence of the substrate. When this happens, clutch driven gear and sprocket assembly 38 is engaged and both the substrate and the lamina sheet are conveyed between pinch rollers 140 and 142 at substantially the same time while being transported at substantially the same speed.

Meanwhile, rollers 140, 142, 154, 156, 196 and 200 are rotatably driven by corresponding components of gear drive train 14, and rotation of these rollers conveys the substrate and laminate along the processing path 148. As the laminated sheet and the substrate pass between pinch rollers 140 and 142, successive portions of the laminate sheet and the substrate are brought into contact. A laminate bearing substrate then emerges from between pinch rollers 140 and 142 and is next conveyed between heated roller assembly 154 and pinch roller 156. As the laminate sheet and the substrate are pressed together, heat from heated roller 154 activates the adhesive on the laminate sheet in order to bond the laminate sheet to the substrate. Given the characteristics of particular lamina 18 and substrate used, the laminated products produced may tend to be characterized either by a convex or concave bend. If this happens, card straightener 194 may be adjusted to apply an appropriate reverse bend to the laminated product before the laminated product leaves apparatus 10 through exit zone 150. Subsequent laminated products are formed from lamina 18 and additional substrates by repeating these operations.

Any conventional control mechanism can be used in the practice of the present invention to respond to sensor signals, actuate the scissors, and engage and disengage the clutch-controlled elements of the gear and sprocket drive-train 14. As one example, apparatus may include a microprocessor which controls such functions. As an additional option, apparatus 10 may include convenience features which convey information about the apparatus 10 to a user. For example, apparatus 10 may be provided with lights or instruments which tell the user information such as the status of the lamina supply, the status of the clutch-controlled elements, heater temperature, orientation of the card straightener axis, number of laminate sheets cut by the scissors 42, and the like.

Figure 9:
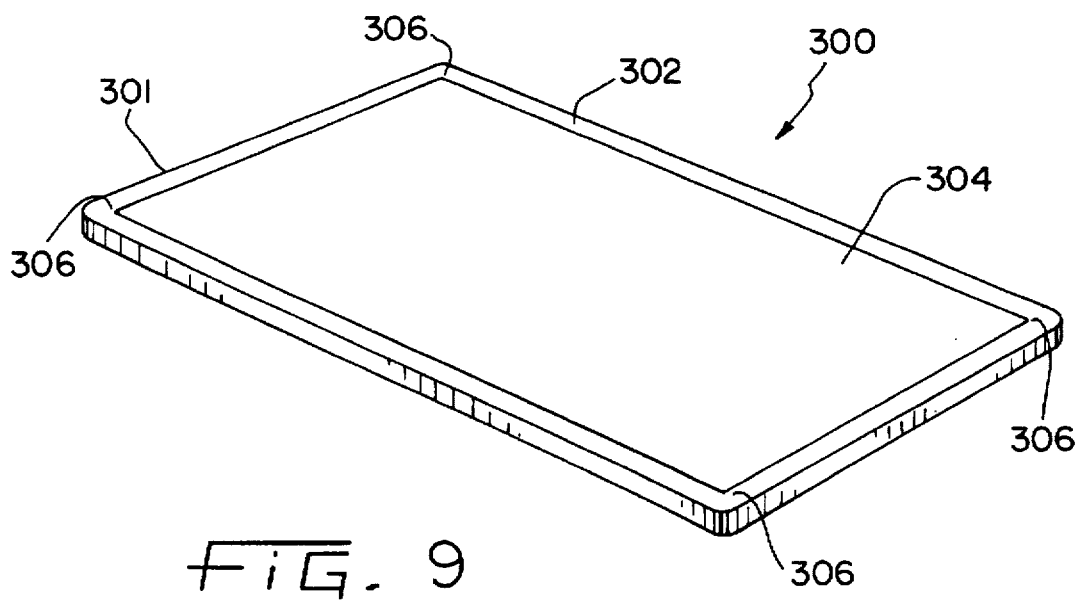
FIG. 9 is a perspective view of a laminated substrate prepared in accordance with the present invention.

FIG. 9 shows a laminated substrate 300 prepared in accordance with the present invention. Laminated substrate 300 includes card-shaped substrate 301 having face 302. Substrate 301 may be made from a variety of materials such as, for example, paper, cardboard, plastic, metal, or the like. Face 302 may include information such as photographs, other graphics, text, data, or the like. Laminate sheet 304 is bonded to face 302. Optionally, the bottom face (not shown) of substrate 301 may also include information and have a second laminate sheet bonded to it as well. Corners 306 are angular, not rounded, and are most typically substantially square. Square corners result when scissors 42 of FIG. 1 is used to cut lamina 18 along a cutting line which is substantially perpendicular to the sides of lamina 18. Advantageously, laminate sheet 304 is slightly narrower and slightly shorter than the face 302 in order to ease registration of the laminate sheet 304 onto face 302. For example, use of a laminate sheet 304 which is ⅛" (0.32 cm) shorter and ⅛" (0.32 cm) narrower than substrate 301 has been found to be suitable in the practice of the present invention.

The characteristics of laminated substrate 300 are distinguishable over laminated substrates made using the prior art techniques described above. For example, when using the "decal" approach, the entire face 302 is covered by laminate material. When using the "die-cut" approach, the laminate sheet corners have been rounded, not square.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An apparatus for making a plurality of laminated substrates by cutting a plurality of protective, transparent laminate sheets from a webless supply of lamina and applying said sheets to a corresponding plurality of planar substrates, each said substrate having information on one face thereof, each said laminate sheet applied over a said one face and substantially completely covering said one face, said apparatus comprising:

a lamina supply member capable of holding a webless supply of lamina material which can be cut into successive sheets of laminate;

a cutter, said cutter capable of cutting said lamina into successive sheets of laminate;

a convergence zone at which successive sheets of laminate and corresponding planar substrates are registrably brought into contact such that each said laminate sheet substantially completely covers a said one face of said substrate;

a lamina supply path extending from said lamina supply member to said convergence zone, said cutter disposed on said lamina supply path;

a lamina sensor disposed on the lamina supply path between the cutter and the convergence zone, said lamina sensor capable of detecting a predetermined reference of the lamina;

a laminate transport means for conveying a laminate sheet along the lamina supply path in a direction from the cutter towards the convergence zone;

a substrate entry zone at which the substrates enter the apparatus;

a substrate supply path extending from the substrate entry zone to the convergence zone;

a substrate sensor disposed on the substrate supply path, said substrate sensor capable of detecting a predetermined reference of the substrate;

a control responsive to the lamina sensor for actuating the cutter to sever a sheet of laminate from the lamina supply when said lamina sensor detects the lamina reference, for actuating said laminate transport means, and for retaining said laminate sheet on said lamina supply path, said control further responsive to said substrate sensor to activate said laminate transport means to cause said laminate sheet and substrate to be registrably brought together at the convergence zone whereby said laminate sheet substantially completely covers said one face of said substrate; and a heater for bonding each successive sheet of laminate to a corresponding substrate to form a laminated substrate.

2. The apparatus of claim 1, wherein the apparatus further comprises lamina transport means for conveying the lamina along the lamina supply path in a direction from the supply of lamina towards the convergence zone.

3. The apparatus of claim 1, wherein the cutter is a motor-driven pair of scissors.

4. The apparatus of claim 3, wherein the scissors comprises:

a fixed cutting blade and a pivoting cutting blade being pivotable about a blade pivot from an open position to a closed position; and wherein at the open position, the lamina supply path extends between the fixed cutting blade and the pivoting cutting blade; and at the closed position, said pivoting cutting blade cuttingly engages the fixed cutting blade.

5. The apparatus of claim 4, wherein the pivoting cutting blade is disposed on the lamina supply path upstream relative to the fixed cutting blade.

6. The apparatus of claim 4, wherein the cutter further comprises a rotatable blade cam shaft and a rotatable blade cam eccentrically mounted on the blade cam shaft, wherein the blade cam is coupled to the cutter such that rotation of the blade cam causes the pivoting cutting blade to pivotably open and close about the blade pivot.

7. The apparatus of claim 1, wherein the apparatus further comprises substrate transport means for conveying the substrates along the substrate supply path in a direction from the substrate entry zone towards the convergence zone.

8. The apparatus of claim 1, further comprising means for generating a signal indicating that the cutter has cut the piece of laminate off from the supply of lamina.

9. The apparatus of claim 1, further comprising:

an exit zone at which the laminated substrates exit the apparatus;

a processing path extending from the convergence zone to the exit zone, wherein the heater is disposed on said processing path.

10. The apparatus of claim 9, wherein the heater comprises a heated roller assembly and a corresponding pinch roller disposed on the processing path such that the processing path passes between the heated roller and the corresponding pinch roller as the laminate sheets and the substrates are conveyed along said processing path; and wherein the heated roller assembly comprises:

a nonrotatable heater core; and a rotatable roller shell housing the nonrotatable heater core such that the roller shell is heated by the core for heatably bonding the laminate sheets to the substrates.

11. The apparatus of claim 9, further comprising a card straightener for applying a reverse bend to the laminated substrates.

12. The apparatus of claim 11, wherein the card straightener is disposed on the processing path between the heater and the exit zone, wherein said card straightener is an assembly comprising:

a first pinch roller having a center of rotation;

a second pinch roller having a center of rotation;

wherein the first and second rollers are disposed on the processing path such that the processing path passes between said rollers;

wherein a line extending from the center of rotation of the first pinch roller to the center of rotation of the second pinch roller defines an axis of the assembly; and wherein said axis is pivotable.

\* \* \* \* \*